United States Patent
Kim

(10) Patent No.: US 11,530,723 B2
(45) Date of Patent: Dec. 20, 2022

(54) POWER TRANSMISSION DEVICE OF STEERING SYSTEM

(71) Applicant: MANDO CORPORATION, Gyeonggi-do (KR)

(72) Inventor: Jong Han Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 574 days.

(21) Appl. No.: 16/556,000

(22) Filed: Aug. 29, 2019

(65) Prior Publication Data
US 2020/0070884 A1 Mar. 5, 2020

(30) Foreign Application Priority Data
Sep. 3, 2018 (KR) .......... 10-2018-0104514

(51) Int. Cl.
| F16D 3/68 | (2006.01) |
| F16F 15/12 | (2006.01) |
| F16F 15/124 | (2006.01) |
| B62D 5/04 | (2006.01) |

(52) U.S. Cl.
CPC ............. *F16D 3/68* (2013.01); *F16F 15/12* (2013.01); *F16F 15/1245* (2013.01); *B62D 5/0409* (2013.01)

(58) Field of Classification Search
CPC ........ B62D 5/0409; F16F 15/10; F16F 15/12; F16F 15/1245; F16F 15/20; B60Y 2306/09; F16D 3/68
See application file for complete search history.

(56) References Cited

U.S. PATENT DOCUMENTS

| 1,579,967 A * | 4/1926 | Sweney | F16D 3/16 464/105 |
| 2,025,824 A * | 12/1935 | Ricefield | F16D 3/68 464/73 |
| 2,025,825 A * | 12/1935 | Ricefield | F16D 3/68 464/73 |

(Continued)

FOREIGN PATENT DOCUMENTS

| CN | 202100619 | 1/2012 |
| CN | 106662162 | 5/2017 |

(Continued)

OTHER PUBLICATIONS

Office Action dated Oct. 8, 2021 for Chinese Patent Application No. 201910826819.6 and its English translation from Google Translate.

*Primary Examiner* — Adam D Rogers
(74) *Attorney, Agent, or Firm* — Ladas & Parry, LLP

(57) ABSTRACT

A power transmission device of a steering system. A first connector includes a first coupling portion coupled to a first shaft and first supporting portions protruding axially from the first coupling portion. A second connector includes a second coupling portion coupled to a second shaft disposed coaxially with the first shaft and second supporting portions protruding axially from the second coupling portion to be circumferentially spaced apart from the first supporting portions. A damper is coupled axially between the first connector and the second connector, and includes blades supported circumferentially between the first supporting portions and the second supporting portions.

18 Claims, 11 Drawing Sheets

(56) References Cited

U.S. PATENT DOCUMENTS

| | | | | |
|---|---|---|---|---|
| 2,924,082 | A * | 2/1960 | Reich | F16D 3/68 |
| | | | | 464/76 |
| 4,335,586 | A * | 6/1982 | Kochendorfer | F16D 1/06 |
| | | | | 464/81 |
| 8,616,986 | B2 * | 12/2013 | Nakagawa | F16D 3/68 |
| | | | | 464/76 |
| 9,434,405 | B2 * | 9/2016 | Yoshikawa | F16D 3/68 |
| 9,777,776 | B2 * | 10/2017 | Kogure | F16D 3/68 |
| 9,789,903 | B2 * | 10/2017 | Moriyama | F16F 15/136 |
| 9,863,482 | B2 * | 1/2018 | Yamaguchi | F16D 3/68 |
| 10,054,190 | B2 * | 8/2018 | Kim | F16D 3/68 |
| 10,738,834 | B2 * | 8/2020 | Oosawa | B62D 5/0409 |
| 11,173,950 | B2 * | 11/2021 | Kim | B62D 5/0409 |
| 11,214,307 | B2 * | 1/2022 | Kwon | B62D 7/226 |
| 2014/0080610 | A1 | 3/2014 | Nakagawa et al. | |
| 2017/0036691 | A1 * | 2/2017 | Kikuchi | F16D 11/10 |

FOREIGN PATENT DOCUMENTS

| | | |
|---|---|---|
| CN | 108372880 | 8/2018 |
| WO | 2015/190054 | 12/2015 |

* cited by examiner

POWER TRANSMISSION DEVICE OF STEERING SYSTEM

CROSS REFERENCE TO RELATED APPLICATION

This application claims priority from Korean Patent Application No. 10-2018-0104514, filed on Sep. 3, 2018, which is hereby incorporated by reference for all purposes as if fully set forth herein.

BACKGROUND

Field

Embodiments relate to a power transmission device of a steering system. More particularly, embodiments relate to a power transmission device of a steering system, the power transmission device being able to transmit torque from a first shaft to a second shaft while reliably maintaining strength without vibrations or noise and to absorb noise due to heat or impacts, as compared to power transmission devices of the related art.

Description of Related Art

A steering system of a vehicle is an apparatus allowing a driver to freely change the direction in which the vehicle is traveling by turning a steering wheel. The steering system serves to change the center of rotation of the front wheels of the vehicle, thereby helping the driver to steer the vehicle in a direction in which he or she wishes to travel. The steering system may be implemented as an electric power-assisted steering system including a power assistance mechanism in order to reduce the amount of force that the driver must exert to change the orientation of the front wheels.

The electric power-assisted steering system is configured to detect the rotation of the steering wheel and to drive a motor disposed on a rack or a steering shaft to assist in the rotation of the front wheels, so that steering can be performed efficiently.

However, in such electric power-assisted steering systems of the related art, a power transmission device is configured such that an inner rotor and an outer rotor are simply fitted to each other when engaged with each other, such that an inner portion of the inner rotor and an inner portion of the outer rotor are in direct contact with each other. When a vehicle has been used for a certain period of time, or is traveling on a specific road, such as gravel road, a large amount of impacts may be inversely input along a steering shaft, thereby causing wear in play portions of the inner rotor and the outer rotor due to contact and generating noise.

In addition, a process of engaging the inner rotor and the outer rotor with each other and a process of applying grease to a space between the inner rotor and the outer rotor may be required, thereby increasing steps required in an assembly process and fabrication costs, which are problematic.

BRIEF SUMMARY

Various aspects provide a power transmission device of a steering system, the power transmission device being able to transmit torque from a first shaft to a second shaft while reliably maintaining strength without vibrations or noise, as compared to power transmission devices of the related art, and to absorb noise due to heat or impacts.

The object of the present disclosure is not limited to the aforementioned description, and other objects not explicitly disclosed herein will be clearly understood by those having ordinary knowledge in the technical field, to which the present disclosure pertains, from the description provided hereinafter.

According to an aspect, embodiments provide a power transmission device of a steering system, including: a first connector including a first coupling portion coupled to a first shaft and first supporting portions protruding axially from the first coupling portion; a second connector including a second coupling portion coupled to a second shaft disposed coaxially with the first shaft and second supporting portions protruding axially from the second coupling portion to be circumferentially spaced apart from the first supporting portions; and a damper coupled axially between the first connector and the second connector, and including blades supported circumferentially between the first supporting portions and the second supporting portions.

According to exemplary embodiments, the power transmission device of a steering system can transmit torque from a first shaft to a second shaft while reliably maintaining strength without vibrations or noise and absorb noise due to heat or impacts, as compared to power transmission devices of the related art.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
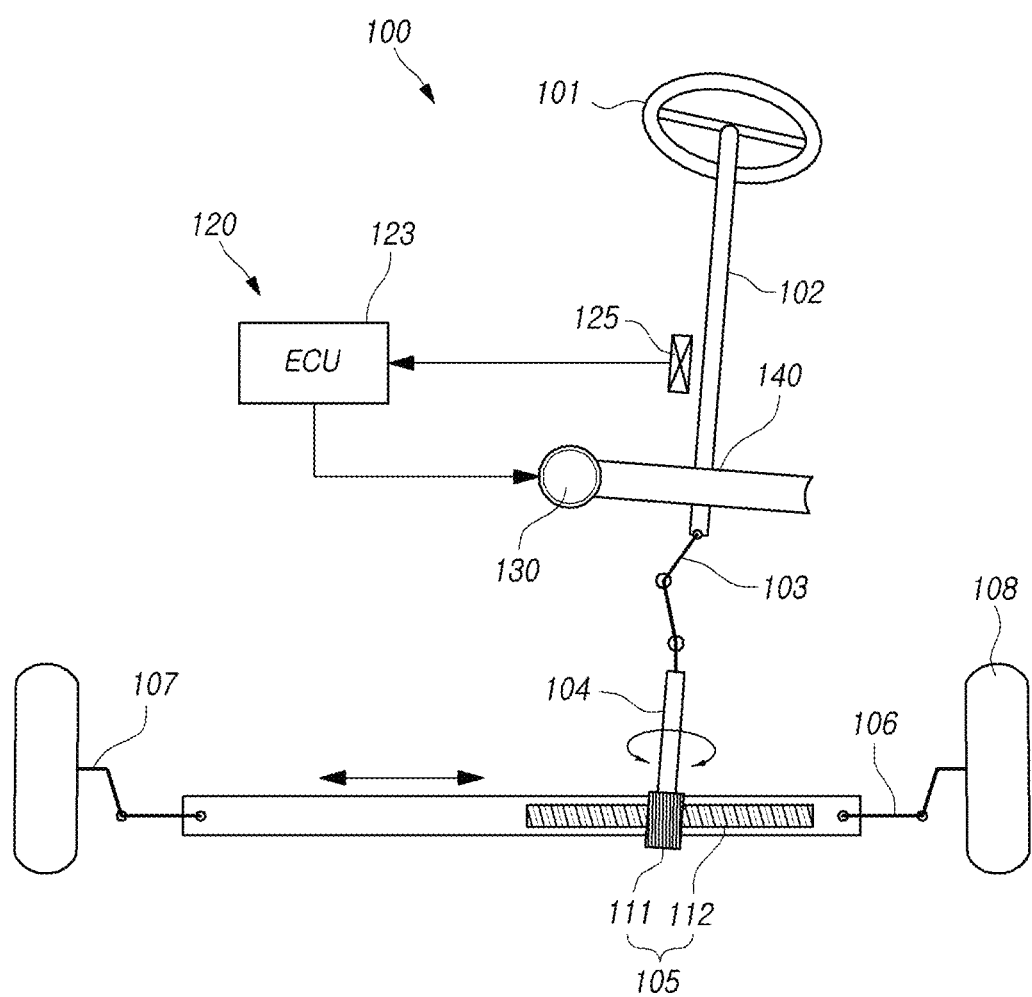
FIG. 1 is a schematic view illustrating a steering system according to embodiments.
Figure 2:
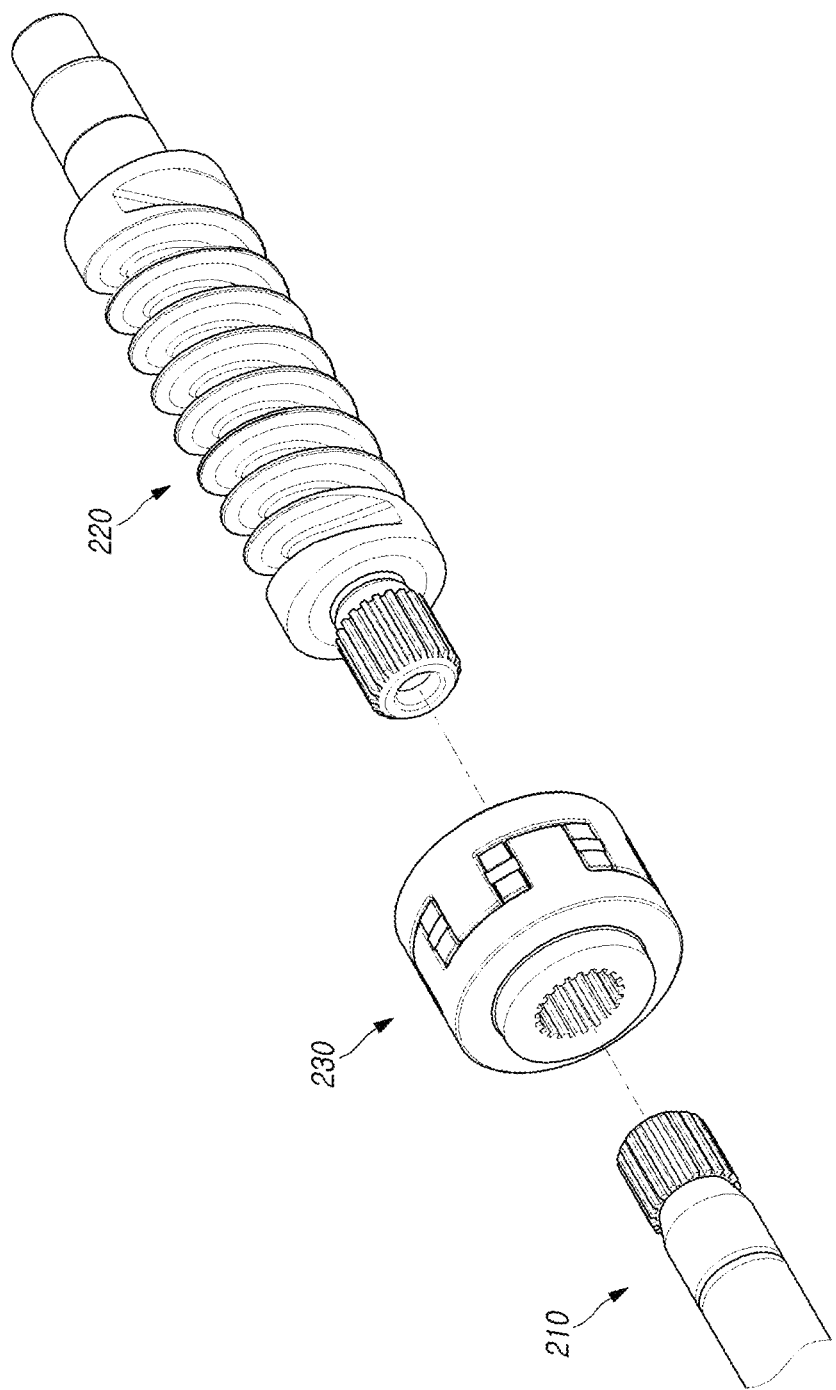
FIGS. 2 to 6 are perspective views illustrating components of the power transmission device of the steering system according to embodiments.
Figure 3:
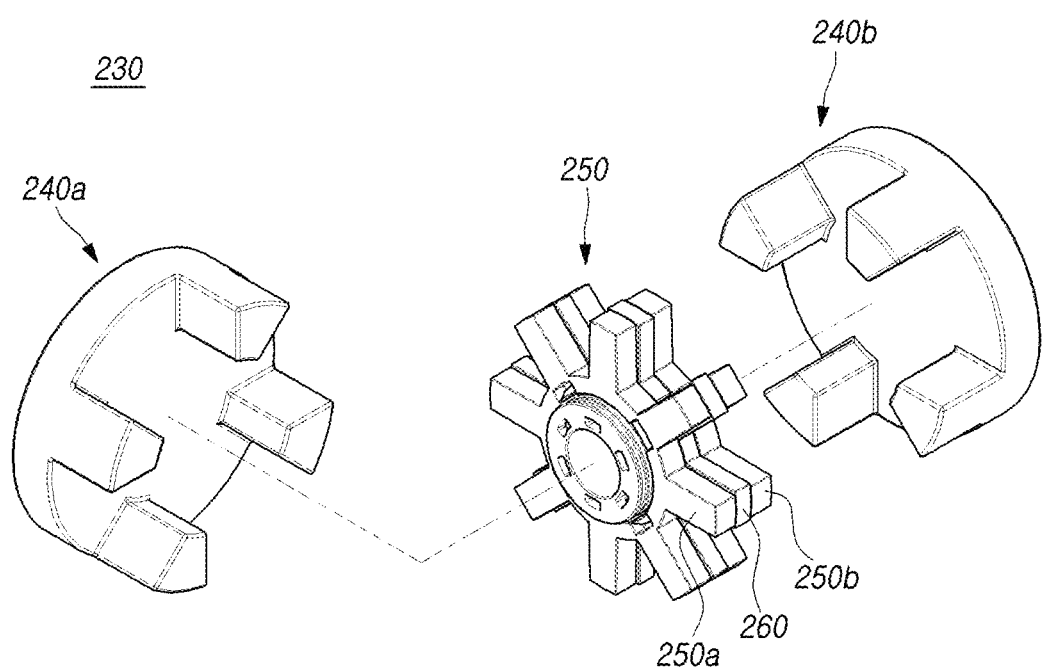
Figure 4:
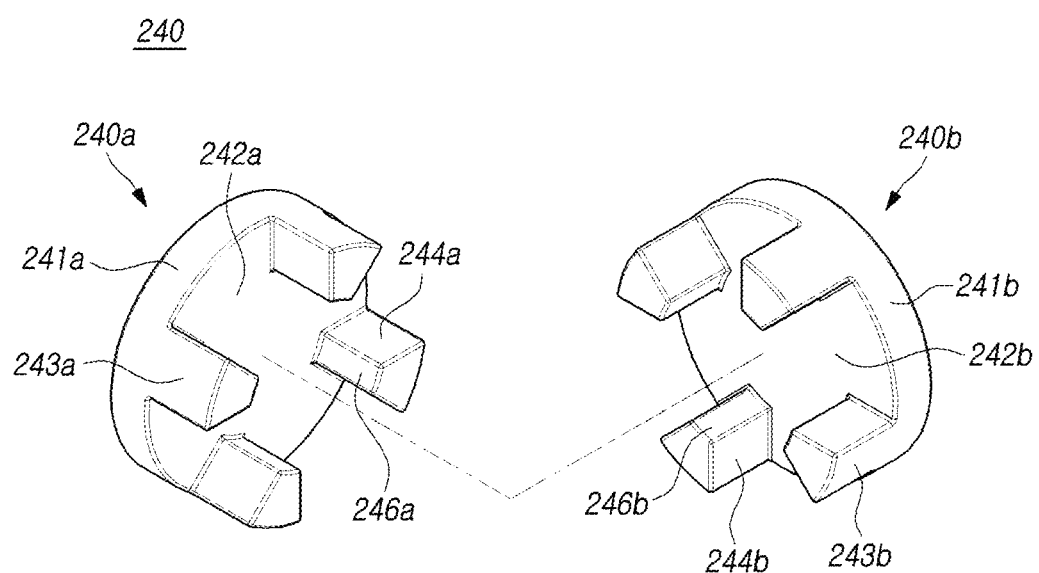
Figure 5:
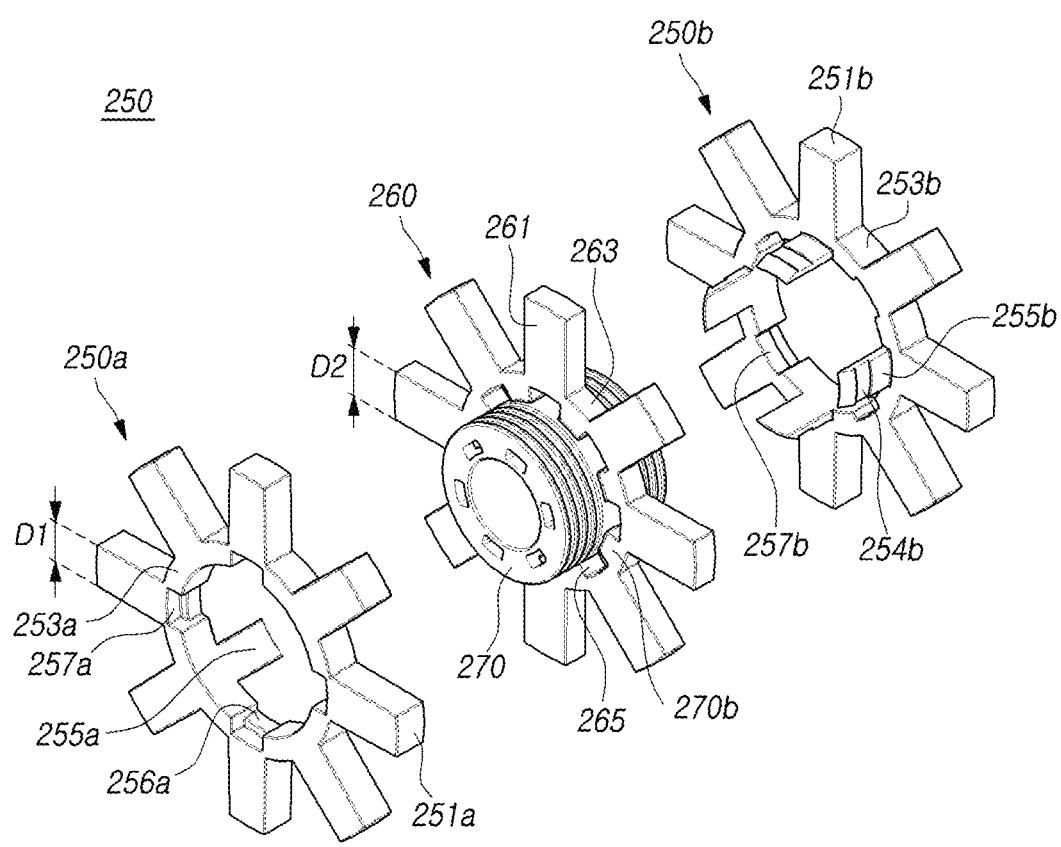
Figure 6:
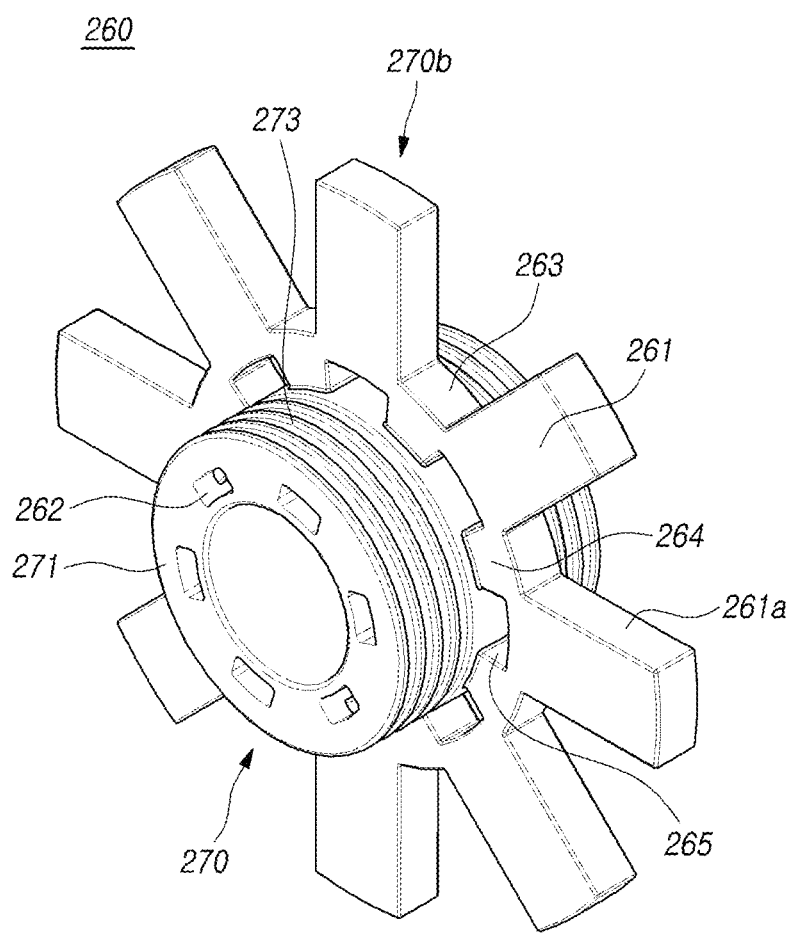

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted in the situation in which the subject matter of the present disclosure may be rendered rather unclear thereby.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 7:
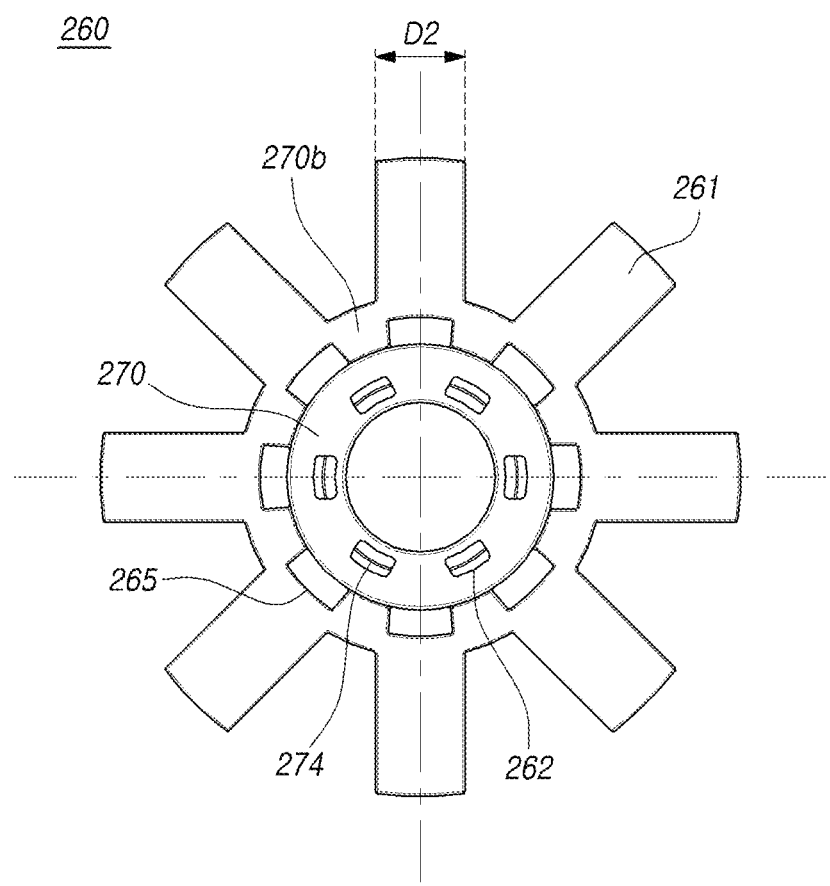
FIG. 7 is a front elevation view illustrating the power transmission device of the steering system according to embodiments.
Figure 8:
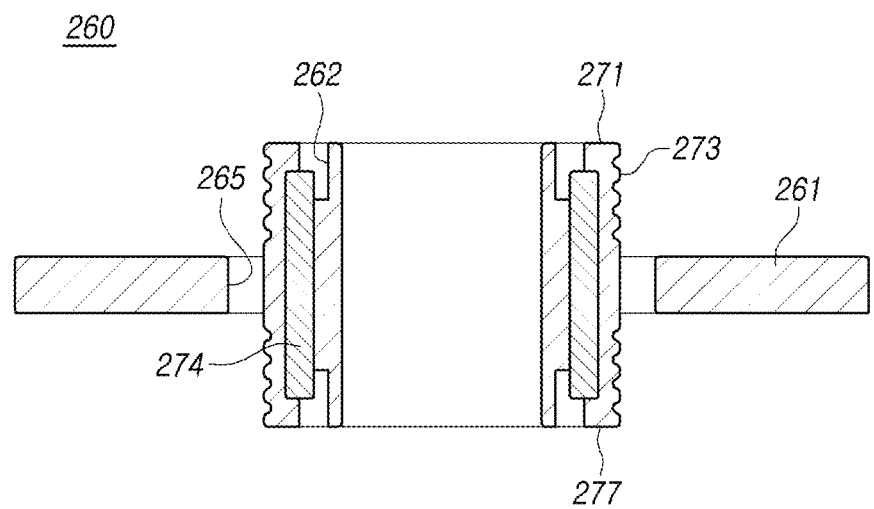
FIGS. 8 to 11 are cross-sectional views illustrating the power transmission device of the steering system according to embodiments.
Figure 9:
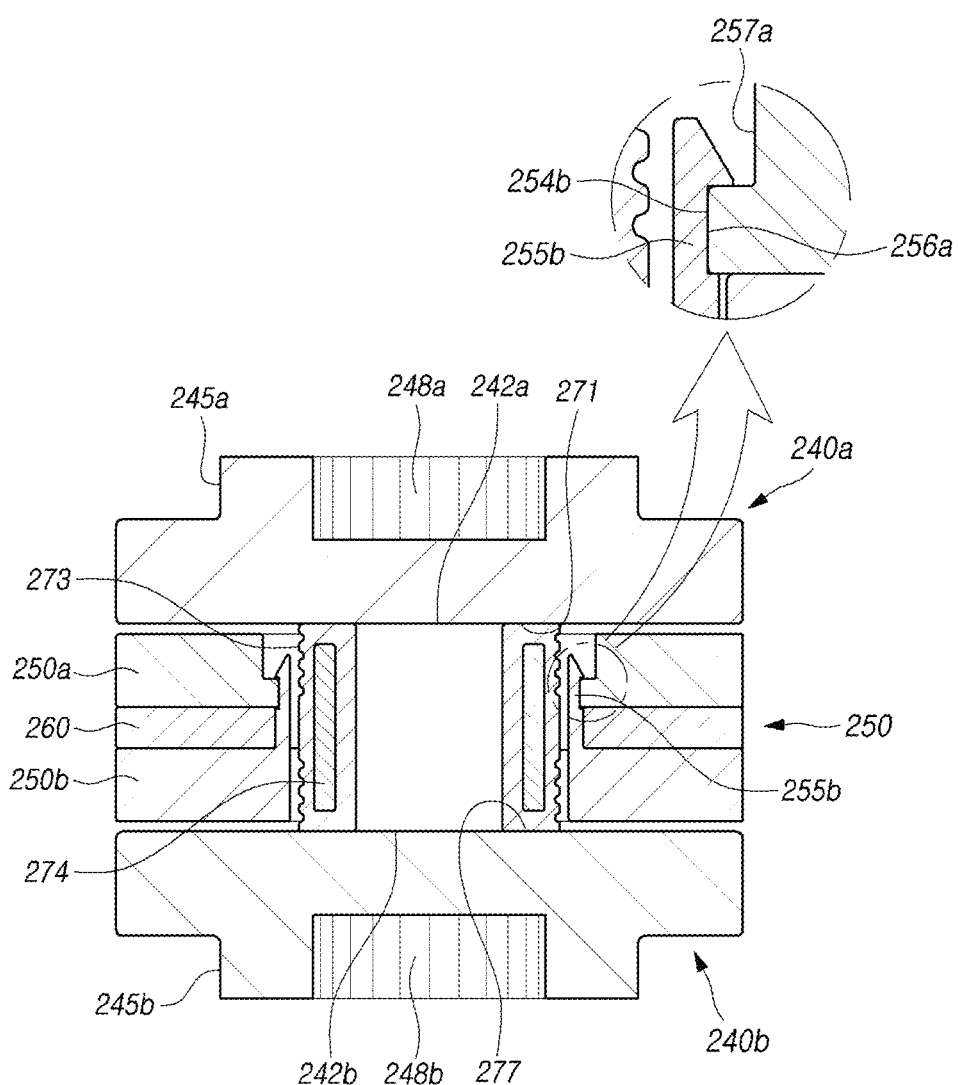
Figure 10:
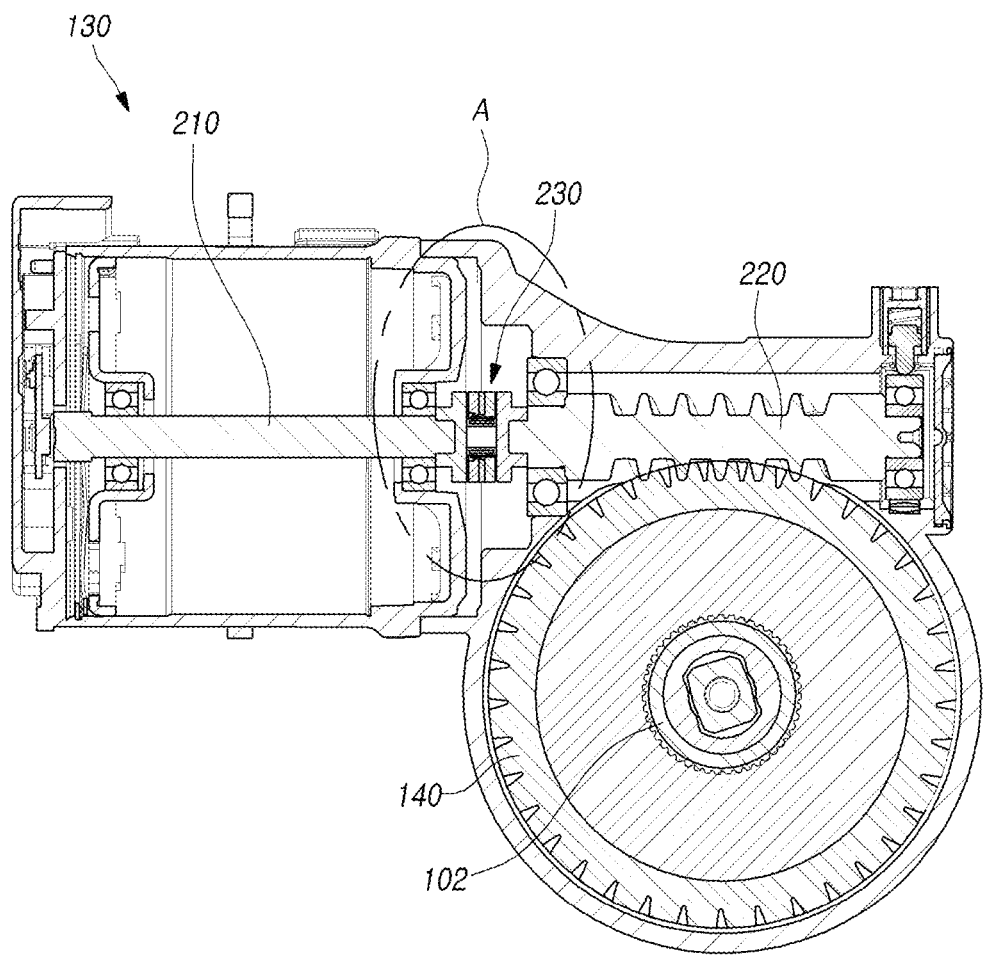
Figure 11:
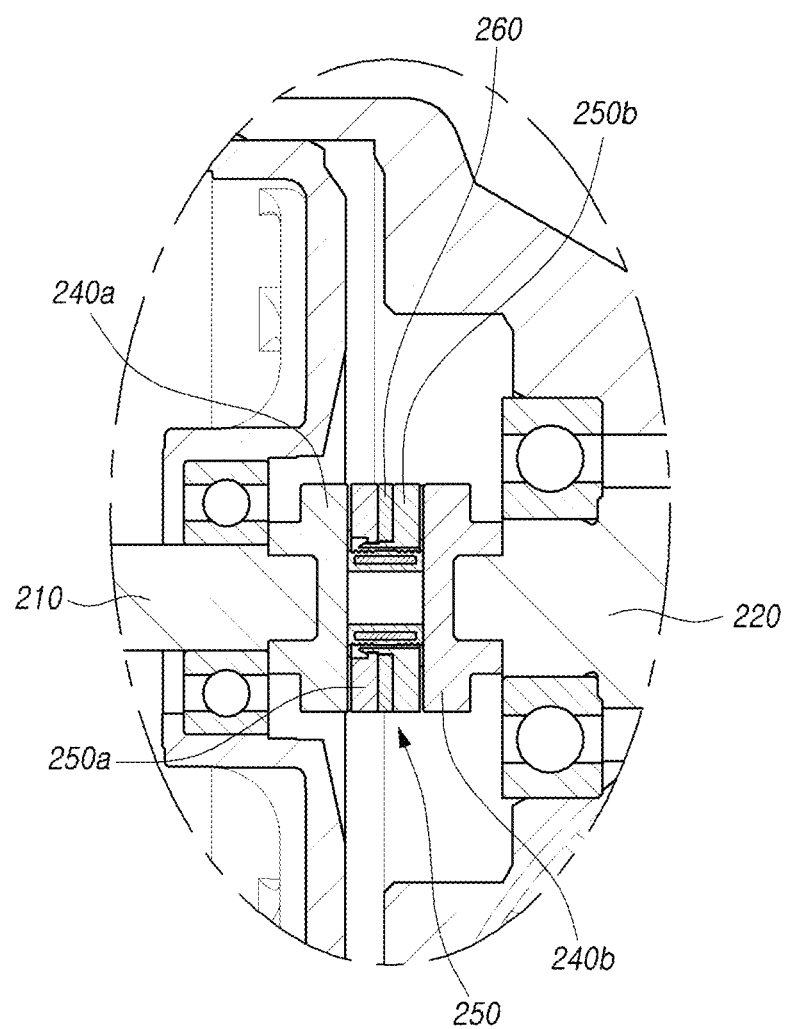

FIG. 1 is a schematic view illustrating a steering system according to embodiments, FIGS. 2 to 6 are perspective views illustrating components of the power transmission device of the steering system according to embodiments, FIG. 7 is a front elevation view illustrating the power transmission device of the steering system according to embodiments, and FIGS. 8 to 11 are cross-sectional views illustrating the power transmission device of the steering system according to embodiments.

As illustrated in the drawings, the power transmission device 230 of a steering system according to embodiments includes a first connector 240a, a second connector 240b, and a damper 250. The first connector 240a includes a first coupling portion 241a coupled to a first shaft 210 and first supporting portions 243a protruding axially from outer circumferential portions of the first coupling portion 241. The second connector 240b includes a second coupling portion 241b coupled to a second shaft 220 disposed coaxially with the first shaft 210 and second supporting portions 243b protruding axially from outer circumferential portions of the second coupling portion 241b to be spaced apart from the first supporting portions 243a in a circumferential direction. The damper 250 is coupled axially between the first connector 240a and the second connector 240b, and includes blades 251a, 261, and 251b supported in a circumferential direction, between the first supporting portions 243a and the second supporting portions 243b.

The power transmission device 230 is connected coaxially to the first shaft 210, which is connected to and rotated by a power source, such as a motor or a pump, to transmit torque from the power source to the second shaft 220. In the detailed description of embodiments, by way of example, the first shaft 210 will be described as a motor shaft of an electric power-assisted steering system, and the second shaft 220 will be described as a worm shaft of the electric power-assisted steering system.

In addition, the first connector 240a will be described as being coupled to the first shaft 210, while the second connector 240b will be described as being coupled to the second shaft 220.

For reference, in this case, the power transmission device 230 connects the motor shaft, generating assistance power of the electric power-assisted steering system, to the worm shaft to transmit the assistance power, generated by the motor, to a steering shaft 340 coupled to a worm gear 350. In this manner, the power transmission device 230 is used as a power transmission device to assist the steering force of a driver.

Here, the electric power-assisted steering system will be briefly described. As illustrated FIG. 1, the electric power-assisted steering system includes a steering assembly 100 including a plurality of components, extending from the steering wheel 101 to vehicle wheels 108, and a power assistance mechanism 120 providing steering assistance power to the steering assembly 100.

The steering assembly 100 includes a steering shaft 102, with one end portion thereof being connected to the steering wheel 101 to rotate along with the steering wheel 101, and the other end portion thereof being connected to a pinion shaft 104 via a pair of universal joints 103.

In addition, the pinion shaft 104 is connected to a rack bar via a rack-pinion gear unit 105, with both ends of the rack bar being connected to the vehicle wheels 108 via tie rods 106 and knuckle arms 107. The rack-pinion gear unit 105 is comprised of a pinion gear 111 provided on the pinion shaft 104 and a rack gear 112 provided on an outer circumferential portion of the rack bar, the pinion gear 111 and the rack gear 112 being engaged with each other. According to this configuration, when the driver manipulates the steering wheel 101, the steering assembly 100 generates torque, which in turn steers the vehicle wheels 108 via the rack-pinion gear unit 105 and the tie rods 106.

The power assistance mechanism 120 includes a torque sensor 125 detecting torque that the driver applies to the steering wheel 101 and outputting an electrical signal proportional to a detected value of the torque, an electronic control unit 123 generating a control signal on the basis of the electrical signal applied from the torque sensor 125, a motor 130 generating assistance power on the basis of a signal applied from the electronic control unit 123, and a decelerator 140 transmitting the assistance power from the motor to the steering shaft 102.

As illustrated in FIGS. 2 to 11, the power transmission device 230 can transmit power between the first and second shafts 210 and 220 while coaxially connecting the first and second shafts 210 and 220 in the power transmission device 230. In this regard, a connector 240 comprised of the first connector 240a and the second connector 240b is coupled to the first shaft 210 and the second shaft 220, and the damper 330 is coupled between the first connector 240a and the second connector 240b.

The first connector 240a includes the first coupling portion 241a coupled to the first shaft 210 and the first supporting portions 243a protruding axially from the outer circumferential portions of the first coupling portion 241.

The second connector 240b is configured in the same manner as the first connector 240a. The second connector 240b includes the second coupling portion 241b coupled to the second shaft 220 disposed coaxially with the first shaft 210 and the second supporting portions 243b protruding axially from the outer circumferential portions of the second coupling portion 241b to be spaced apart from the first supporting portions 243a in the circumferential direction.

In addition, the damper 250 is coupled axially between the first connector 240a and the second connector 240b. The damper 250 includes the blades 251a, 261, and 251b supported in the circumferential direction, between the first supporting portions 243a of the first connector 240a and the second supporting portions 243b of the second connector 240b.

The first coupling portion 241a of the first connector 240a has a first fitting recess 248a, into which the first shaft 210 is fitted. The first fitting recess 248a is provided in a portion of first connector 240a opposite to the first supporting portions 243a. In the first connector 240a, a first protruding end portion 245a may protrude axially from one end of the first coupling portion 241a, in a direction opposite to the first supporting portions 243a. The first fitting recess 248a may be provided within the first coupling portion 241a and the first protruding end portion 245a.

A serration is provided axially on the inner circumferential surface of the first fitting recess 248a to be engaged with a corresponding serration of the first shaft 210, so as to prevent lost motion or skidding during rotation of the first shaft 210.

The second coupling portion 241b of the second connector 240b has a second fitting recess 248b, into which the second shaft 220 is fitted. The second fitting recess 248b is provided in a portion of the second connector 240b opposite to the second supporting portions 243b. In the second connector 240b, a second protruding end portion 245b may protrude axially from one end of the second coupling portion 241b, in a direction opposite to the second supporting portions 243b. The second fitting recess 248b may be provided within the second coupling portion 241b and the second protruding end portion 245b.

A serration is provided axially on the inner circumferential surface of the second fitting recess 248b to be engaged with a corresponding serration of the second shaft 220, so as to prevent lost motion or skidding during rotation of the second shaft 220.

The damper 250, coupled axially between the first connector 240a and the second connector 240b, includes a first outer support member 250a, a second outer support member 250b, and an inner support member 260. The first outer support member 250a has the first outer blades 251a protruding radially from the outer circumferential portions of an annular first body 253a thereof. The second outer support member 250b has the second outer blades 251b protruding radially from the outer circumferential portions of an annular second body 253b thereof. The inner support member 260 is coupled axially between the first outer support member 250a and the second outer support member 250b, and includes the inner blades 261 supported axially between the first outer blades 251a and the second outer blades 251b.

In addition, the inner support member 260 includes a cylindrical axial support member 270 and a radial support member 270b. The axial support member 270 is fitted into the first outer support member 250a and the second outer support member 250b. The radial support member 270b includes an inner body 264 connected to outer circumferential portions of the axial support member 270 and the inner blades 261 provided on outer circumferential portions of the inner body 264. The axial support member 270 and the radial support member 270b may be injection molded as an integral part.

Here, a threaded portion 273 is provided on the outer circumference of the axial support member 270, with ridges and grooves thereof alternating in an axial direction, thereby allowing the axial support member 270 to be elastically deformed while absorbing axial load when the first shaft 210 and the second shaft 220 move or play.

In addition, inner circumferential surfaces 246a of the first supporting portions 243a and inner circumferential surfaces 246b of the second supporting portions 243b maintain radial distances from an outer circumferential surface 263 of the inner body 264 in an assembled position.

The axial support member 270 is made of an elastic material. Annular strength-enhancing members 274 are provided within the axial support member 270, and are made of a metal or a plastic. The strength-enhancing members 274, the axial support member 270, and the radial support member 270b may be injection molded as an integral part.

The axial support member 270 and the radial support member 270b are made of a material selected from among, but not limited to, natural rubber (NR), nitrile butadiene rubber (NBR), chloroprene rubber (CR), ethylene propylene terpolymer (EPDM), fluoro rubber (FPM), styrene butadiene rubber (SBR), chlorosulphonated polyethylene (CSM), urethane, and silicone. The axial support member 270 and the radial support member 270b have a damping function to absorb noise and vibrations.

The strength-enhancing members 274 may be made of not only a metal, but also an engineering plastic material selected from among, but not limited to, polyacetal (POM), polyamide (PA), polycarbonate (PC), polyimide (PI), and polybutylene terephthalate (PBT), so as to damp noise and vibrations.

In addition, jig holes 262 are provided in one or both of one side and the other side of the axial support member 270.

The strength-enhancing members 274 are fixedly held in the jig holes 262, so as to be integrated with the axial support member 270.

Accordingly, in injection molding of the inner support member 260, in a position in which molding jigs fixedly hold the strength-enhancing members 274 via the jig holes 262, an elastically material may be integrally molded on outer surfaces of the strength-enhancing members 274, so that the axial support member 270 and the strength-enhancing members 274 are integrally injection-molded.

In addition, even when an axial load, caused by the movement of the first shaft 210 and the second shaft 220, is transferred to the axial support member 270, the axial support member 270 can be supported by the strength-enhancing members 274, thereby maintaining strength.

The radial support member 270b has through-holes 265 extending axially between the outer circumferential surface of the axial support member 270 and the inner body 264.

In addition, the first outer support member 250a has first extensions 255a protruding axially from inner circumferential portions of the first body 253a to extend through the corresponding through-holes 265 of the radial support member 270b.

In addition, the second outer support member 250b has second extensions 255b protruding axially from inner circumferential portions of the second body 253b to extend through the corresponding through-holes 265 circumferentially adjacent to the through-holes 265, through which the first extensions 255a extend.

Accordingly, the first extensions 255a of the first outer support member 250a and the second extensions 255b of the second outer support member 250b are disposed alternately in the circumferential direction so as to extend through and be coupled to the through-holes 265 of the radial support member 270b, respectively.

That is, when the damper 250 is viewed in an axial direction, the first extensions 255a and the second extensions 255b are disposed alternately in the circumferential direction, such that circumferential supporting force can be uniformly distributed when the first shaft 210 and the second shaft 220 are rotated.

In addition, the first outer support member 250a has first connecting recesses 257a provided in inner circumferential portions thereof, in positions corresponding to the through-holes 265 of the radial support member 270b, such that the second extensions 255b may extend through the through-holes 265 to be coupled to the first connecting recesses 257a.

Each of the second extensions 255b has a fitting recess 254b provided on an outer surface thereof, and each of the first connecting recesses 257a has a fitting protrusion 256a, such that the fitting protrusions 256a are engaged with the fitting recesses 254b, respectively. Accordingly, the first outer support member 250a and the second outer support member 250b are coupled so as not to be decoupled in the axial direction.

In addition, the second outer support member 250b has second connecting recesses 257b provided in inner circumferential portions thereof, corresponding to the through-holes 265 of the radial support member 270b, such that the first extensions 255a may extend through the through-holes 265 to be coupled to the second connecting recesses 257b.

Each of the first extensions 255a has a fitting recess provided on an outer surface thereof, and each of the second connecting recesses 257b has a fitting protrusion, such that the fitting protrusions of the connecting recesses 257b are engaged with the fitting recesses of the first extensions 255a, respectively. In this manner, the first extensions 255a may be coupled to the second connecting recesses 257b, respectively, and the second extensions 255b may be coupled to the first connecting recesses 257a, respectively.

In addition, one end portion 271 and the other end portion 277 of the axial support member 270 protrude axially beyond the first outer support member 250a and the second outer support member 250b, respectively.

One end portion 271 of the axial support member 270 is supported on the inner surface 242a of the first coupling portion 241a, and the other end portion 277 of the axial support member 270 is supported on the inner surface 242b of the second coupling portion 241b.

In addition, the inner surface 242a of the first coupling portion 241a and the first outer support member 250a are axially spaced apart from each other, and the inner surface 242b of the second coupling portion 241b and the second outer support member 250b are axially spaced apart from each other.

Accordingly, when a load is applied axially due to the movement of the first shaft 210 and the second shaft 220, damping is enabled by elastic deformation of one end portion 271 and the other end portion 277 of the axial support member 270, thereby preventing noise caused by the collision between the connector 240 and the damper 250.

In addition, the first outer blades 251a, the second outer blades 251b, and the inner blades 261 of the inner damper 250 are disposed to overlap in the axial direction, so as to alternate circumferentially with the first supporting portions 243a and the second supporting portions 243b.

In addition, the circumferential width D2 of each of the inner blades 261 is greater than the circumferential width D1 of each of the first outer blades 251a and the second outer blades 251b.

In addition, both side surfaces 261a of the inner blades 261 in the circumferential direction are supported and elastically pressed by both side surfaces 244a and 244b of the first supporting portions 243a and the second supporting portions 243b.

Accordingly, when the first shaft 210 and the second shaft 220 are rotated, the both side surfaces 261a of the inner blades 261 are elastically deformed in one direction and the other direction while being supported by the both side surfaces 244a and 244b of the first supporting portions 243a and the second supporting portions 243b, thereby enabling damping and preventing noise caused by impacts.

According to the embodiments having the above-described structures and configurations, the power transmission device of a steering system can transmit torque from a first shaft to a second shaft while reliably maintaining strength without vibrations or noise and can absorb noise due to heat or impacts, as compared to power transmission devices of the related art.

Although all of the components constituting exemplary embodiments have been described as being combined together or as operating in concert with each other, the present disclosure is not necessarily limited thereto. Rather, one or more components may be selected from the entire components to be combined together and operate in a combined form within the scope of the present disclosure. It will be understood that the terms "comprise", "include", "have", and any variations thereof used herein are intended to cover non-exclusive inclusions unless explicitly described to the contrary. Unless otherwise specified, all terms including technical and scientific terms used herein have the same meaning as commonly understood by those having ordinary knowledge in the technical field to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A power transmission device of a steering system, comprising:
    a first connector comprising a first coupling portion coupled to a first shaft and first supporting portions protruding axially from the first coupling portion;
    a second connector comprising a second coupling portion coupled to a second shaft disposed coaxially with the first shaft and second supporting portions protruding axially from the second coupling portion to be circumferentially spaced apart from the first supporting portions; and
    a damper coupled axially between the first connector and the second connector, and comprising blades supported circumferentially between the first supporting portions and the second supporting portions, wherein the damper comprises a cylindrical axial support member including a threaded portion provided on an outer circumferential surface of the cylindrical axial support member, the threaded portion having axially alternating ridges and grooves.

2. The power transmission device according to claim 1, wherein:
    the blades of the damper comprise first outer blades, second outer blades, and inner blades, and
    the damper comprises:
    a first outer support member including the first outer blades, among the blades, protruding radially from an outer circumferential surface of an annular first body thereof;
    a second outer support member including the second outer blades, among the blades, protruding radially from an outer circumferential surface of an annular second body thereof; and
    an inner support member coupled axially between the first outer support member and the second outer support member, and including the inner blades supported axially between the first outer blades and the second outer blades.

3. The power transmission device according to claim 2, wherein the inner support member comprises:
   the cylindrical axial support member fitted into the first outer support member and the second outer support member; and
   a radial support member including an inner body connected to an outer circumferential surface of the axial support member and the inner blades provided on an outer circumferential surface of the inner body.

4. The power transmission device according to claim 3, wherein the axial support member is made of an elastic material, and an annular strength-enhancing member made of a metal or a plastic is provided within the axial support member.

5. The power transmission device according to claim 3, wherein the radial support member has through-holes extending axially between the outer circumferential surface of the axial support member and the inner body.

6. The power transmission device according to claim 5, wherein the first outer support member has first extensions protruding axially from an inner circumferential surface of the annular first body to extend through first through-holes among the through-holes.

7. The power transmission device according to claim 6, wherein the second outer support member has second extensions protruding axially from an inner circumferential surface of the annular second body to extend through second through-holes among the through-holes, circumferentially adjacent to the first through-holes, through which the first extensions extend.

8. The power transmission device according to claim 7, wherein the first extensions and the second extensions extend through the through-holes while alternating circumferentially with each other.

9. The power transmission device according to claim 8, wherein the first outer support member has first connecting recesses provided in an inner circumferential surface of the first outer support member, in positions corresponding to the second through-holes, such that the second extensions are coupled to the first connecting recesses through the second through-holes.

10. The power transmission device according to claim 9, wherein each of the second extensions has a fitting recess provided on an outer surface thereof, and each of the first connecting recesses has a fitting protrusion, such that the fitting protrusions are engaged with the fitting recesses, respectively.

11. The power transmission device according to claim 10, wherein the second outer support member has second connecting recesses provided in an inner circumferential surface of the second outer support member, in positions corresponding to the first through-holes, such that the first extensions are coupled to the second connecting recesses through the through-holes.

12. The power transmission device according to claim 11, wherein each of the second extensions has a fitting recess provided on an outer surface thereof, and each of the first connecting recesses has a fitting protrusion, such that the fitting protrusions are engaged with the fitting recesses, respectively.

13. The power transmission device according to claim 3, wherein one end portion and an other end portion of the axial support member protrude axially beyond the first outer support member and the second outer support member, respectively.

14. The power transmission device according to claim 13, wherein the one end portion of the axial support member is supported on an inner surface of the first coupling portion, and the other end portion of the axial support member is supported on an inner surface of the second coupling portion.

15. The power transmission device according to claim 3, wherein the first outer blades, the second outer blades, and the inner blades are disposed to overlap in an axial direction, so as to alternate circumferentially with the first supporting portions and the second supporting portions.

16. The power transmission device according to claim 15, wherein a circumferential width of each of the inner blades is greater than a circumferential width of each of the first outer blades and the second outer blades.

17. The power transmission device according to claim 16, wherein both side surfaces of the inner blades in a circumferential direction are supported and elastically pressed by both side surfaces of the first supporting portions and the second support portions.

18. A power transmission device of a steering system, comprising:
   a first connector comprising a first coupling portion coupled to a first shaft and first supporting portions protruding axially from the first coupling portion;
   a second connector comprising a second coupling portion coupled to a second shaft disposed coaxially with the first shaft and second supporting portions protruding axially from the second coupling portion to be circumferentially spaced apart from the first supporting portions; and
   a damper coupled axially between the first connector and the second connector, and comprising blades supported circumferentially between the first supporting portions and the second supporting portions, wherein the damper comprises an axial support member having a jig hole in one or both of one side surface and an other side surface of the axial support member and an annular strength-enhancing member provided within the axial support member, the strength-enhancing member being fixedly held in the jig hole to be integrated with the axial support member.

* * * * *